United States Patent [19]

Wentzell

[11] Patent Number: 4,485,847
[45] Date of Patent: Dec. 4, 1984

[54] COMPRESSION SLEEVE TUBE REPAIR

[75] Inventor: Timothy H. Wentzell, South Windsor, Conn.

[73] Assignee: Combustion Engineering, Inc., Windsor, Conn.

[21] Appl. No.: 477,292

[22] Filed: Mar. 21, 1983

[51] Int. Cl.³ .................... F16L 55/12; F16L 55/16
[52] U.S. Cl. .................................. 138/89; 138/98; 29/157 C; 29/157 R; 29/157.4; 29/402.12; 411/24; 411/44
[58] Field of Search ................. 138/89, 97, 98; 29/157.3 C, 157.3 R, 157.4, 402.09, 402.11, 402.12, 402.14, 402.15, 402.17; 411/24–28, 44, 54

[56] References Cited

U.S. PATENT DOCUMENTS

| Re. 30802 | 11/1981 | Rogers | 138/98 |
| 710,534 | 10/1902 | Steward | 411/25 |
| 2,855,003 | 10/1958 | Thaxton | 138/90 |
| 2,951,284 | 9/1960 | Caldwell | 29/402.11 |
| 3,156,373 | 11/1964 | Willis | 138/89 |
| 3,542,076 | 11/1970 | Richardson | 138/89 |
| 3,708,098 | 1/1973 | Roznovsky | 138/89 |
| 4,114,654 | 9/1978 | Richardson | 138/89 |
| 4,130,232 | 12/1978 | Anderson | 138/89 |

FOREIGN PATENT DOCUMENTS 60919 3/1943 Denmark .................... 411/24

Primary Examiner—John W. Shepperd
Attorney, Agent, or Firm—L. James Ristas

[57] ABSTRACT

A generally cylindrical tube repair assembly (26,80) having an outer diameter approximately equal to the tube inner diameter. The assembly includes three main components, one of which is compressed and expanded by the other two into sealing engagement with the tube wall. The components include an elongated tension member (28) having an enlarged head portion (30) at its upper or lead end, and a stem portion (34) at the other end. A generally cylindrical expander ring member (40) is disposed about the lower portion of the tension member, and a ferrule-type, radially expandable compression member or sleeve (44) is interposed between the enlarged head and the ring. Means (42) are included for immobilizing the ring member against the tube sheet (12) while drawing down the tension member head. Tapered surfaces (46,48,50,52) on the sleeve, the head, and the ring produce a wedge-like interaction therebetween, such that the upper and lower surfaces of the sleeve expand outwardly into sealing engagement (70,74) with the adjacent tube wall (16').

11 Claims, 7 Drawing Figures

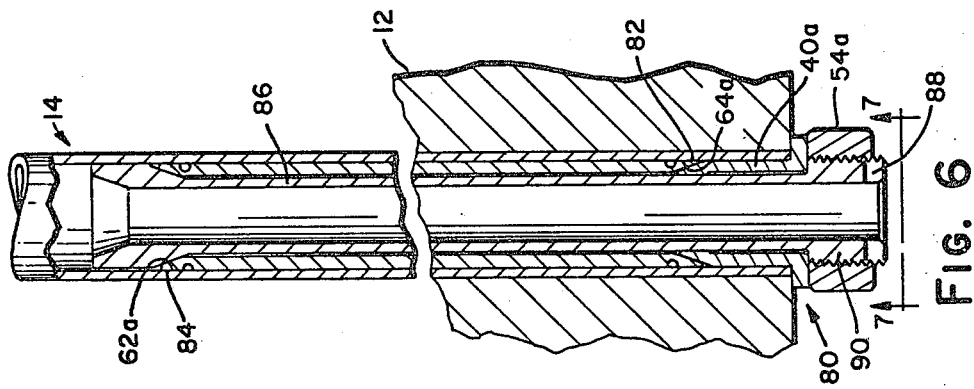
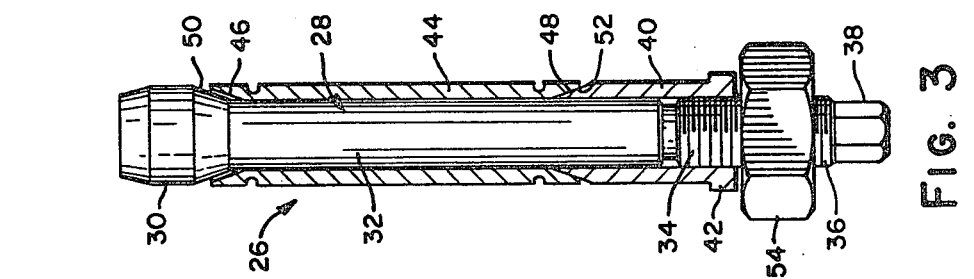
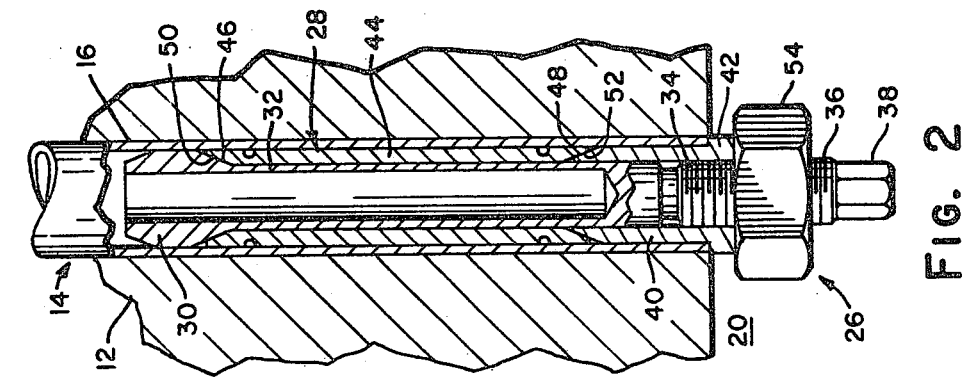
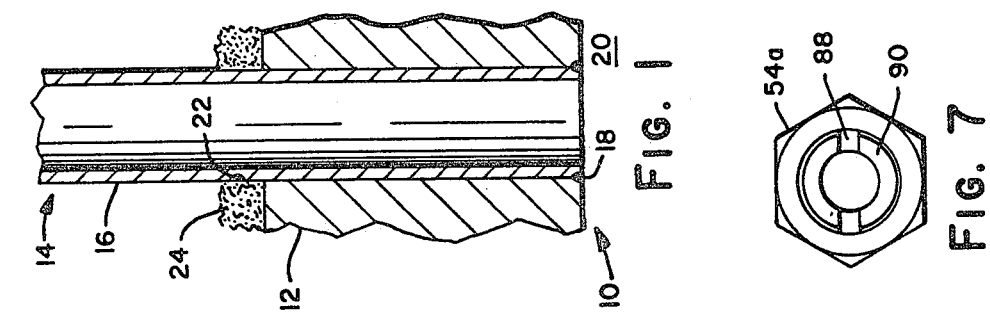

COMPRESSION SLEEVE TUBE REPAIR

BACKGROUND OF THE INVENTION

The present invention relates to tube repair, and more particularly to securing a plug or bypass member within a tube.

Nuclear power stream supply systems, particularly the pressurized water type, include a large steam generator heat exchanger having tube and shell sides separated by a thick tube sheet. It sometimes is necessary to reduce leakage from the tube to shell sides in order to reduce the level of radioactivity ultimately released to the environment. Repairing the tube leaks is a complex undertaking because the steam generator, even when drained, is radioactive in the area of the tube sheet. Accordingly, such repair operations must be performed very quickly by hand, or be adapted for remote, automated installation.

A variety of prior tube repair techniques have been tried, but have not proven satisfactory. It has been difficult to combine the desirable attributes of quick installation, leaktight sealing throughout a wide range of thermal and stress cycling, and easy removal if later desired.

SUMMARY OF THE INVENTION

The present invention satisfies the above requirements, in the form of a generally cylindrical tube repair assembly having an outer diameter approximately equal to the tube inner diameter. The assembly includes three main components, one of which is compressed and expanded by the other two into sealing engagement with the tube wall. In one embodiment, the repair assembly is a plug to prevent tube side fluid from entering the impaired tube. In another embodiment, the assembly is a bypass conduit that permits fluid flow through the tube while bypassing the tube defect.

The components of the inventive device include an elongated tension member having an enlarged head portion at its upper or lead end, and a stem portion at the other end. A generally cylindrical ring member is disposed about the lower portion of the tension member, and a ferrule-type, radially expandable compression member or sleeve is interposed between the enlarged head and the ring. Means are included for immobilizing the ring member against the tube sheet while drawing down the tension member head. Tapered surfaces on the sleeve, the head, and the ring produce a wedge-like interaction therebetween, such that the upper and lower surfaces of the sleeve expand outwardly into sealing engagement with the adjacent tube wall. The stem portion extents below the tube sheet and is adapted to support the ring and effect the tension member draw-down.

The advantages of the present invention include quick installation time, on the order of 30 seconds per plug or bypass assembly. The plug or bypass may be removed and replaced with, for example, a longer bypass. A constant preload under both hot and cold conditions is maintained as a result of the preferred use of the tube material for the repair device components. Also, both ends of the compression sleeve are sealed against the tube at the same time, thereby avoiding the time delay and procedural complexities associated with multi-step sealing operations.

BRIEF DESCRIPTION OF THE DRAWINGS

The preferred embodiments of the invention are described below with reference t the accompanying drawings in which:

FIG. 1 is a schematic of a tube sheet in a nuclear steam generator, with a representative tube secured thereto;

FIG. 2 is a partially sectioned elevation view of the tube plug embodiment of the invention, inserted within a tube prior to forming the seal between the plug and the tube;

FIG. 3 is a view of the inventive plug assembly prior to insertion within the tube;

FIG. 6 is a partially sectioned elevation view of an alternative embodiment of the invention, showing a tube bypass assembly to be secured to the tube wall such that fluid flow through the tube is maintained;

FIg. 7 is an end view of the bypass assembly, taken along line 7 of FIG. 6.

DESCRIPTION OF THE PREFERRED EMBODIMENT

Figure 4:
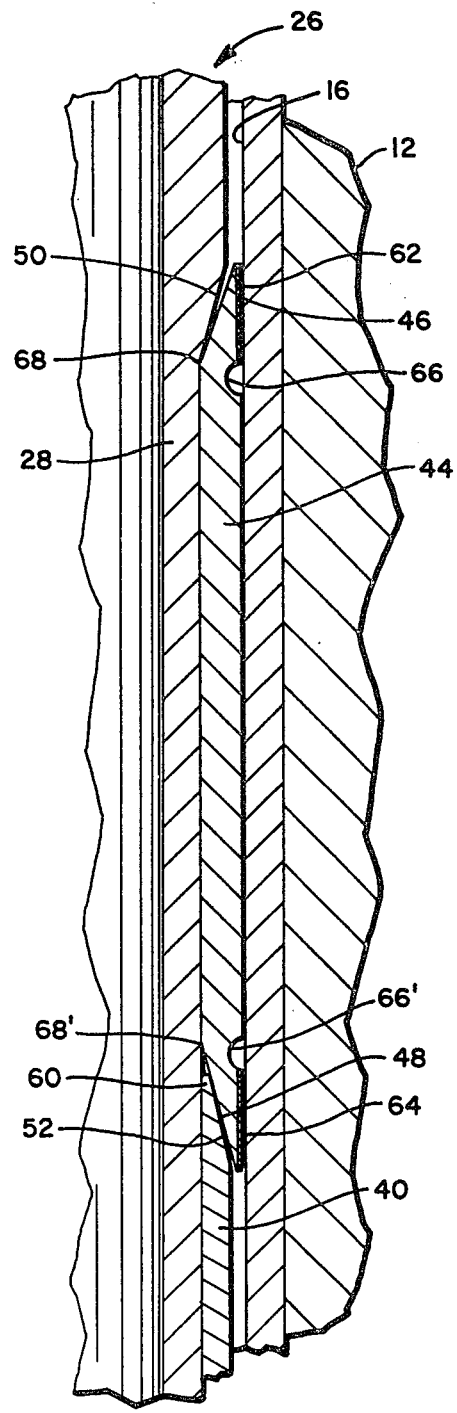
FIG. 4 is a detailed view of the tension member, compression sleeve member, and ring member of the plug assembly, located within the tube prior to formation of the seal between the sleeve and the tube.

FIG. 1 shows a portion of a typical tube sheet 12 of a heat exchanger 10, such as a nuclear steam generator, wherein a plurality of generally cylindrical metal tubes 14 are secured to the tube sheet 12. The tube walls 16 are generally relatively thin and are usually sealed at 18 to the bottom of the tube sheet 12. The plenum region generally shown as 20 normally contains a liquid at high temperature and pressure, which is forced through the tubes 14 such that water surrounding the tubes 14 (not shown) is converted to steam.

In vertical nuclear steam generators, it has been observed that a layer of crud or sludge 24 forms at the upper surface of the tube sheet 12. At that elevation, tube deterioration or defects 22 sometimes occurs and have required remedial action.

Two such remedies are plugging the tube at the tube sheet, or installing a bypass conduit to isolate the defects 22 from the fluid passing through the tube 14. Particuarly in a nuclear steam generator, the radioactive fluid within the tubes must not leak through the tube wall 16 into the shell side water surrounding the tube 14, thereby contaminating the secondary working fluid.

FIGS. 2 and 3 show one embodiment of the invention wherein a tube repair plug assembly 26 may be quickly and effectively inserted within and secured to the tube to prevent entry of primary water from the plenum region 20. The plug assembly includes a generally cylindrical tension member 28 that is preferably machined as a unitary piece. Member 28 includes an upper expander means, or enlarged head, 30, a generally cylindrical body portion 32, and a stem portion 34 the stem portion preferably having screw thread 36 and retention head 38 at the lower end thereof. The tension member 28 is preferably bored and counterbored from the head 30 into the stem, as shown in FIG. 2. This reduces the weight of the plug device and provides some degree of flexibility for faciliatig the interaction of the head portion 30 required to effect the seal as described below. Also, the tension member thermal expansion and contraction will more closely resemble that of the tube.

The plug assembly 26 further includes a lower expander ring 40 concentrically disposed about the lower end of the body portion 32, the ring member including a flange 42 or other means for cooperating with the tube sheet lower surface to limit the upward travel of the expander ring relative to the tube sheet 12.

The third major component of the plug assembly 26 is a generally cylindrical compression sleever 44 carried between the expander head 30 and the expander ring 40. The compression sleeve surrounds the body portion 32 of the tension member and includes upper tapered surfaces 46 and lower tapered surfaces 48 for interacting with oppositely facing, overlapping tapered surfaces 50 on the expander head 30 and 52 on the lower expander ring 40.

Figure 5:
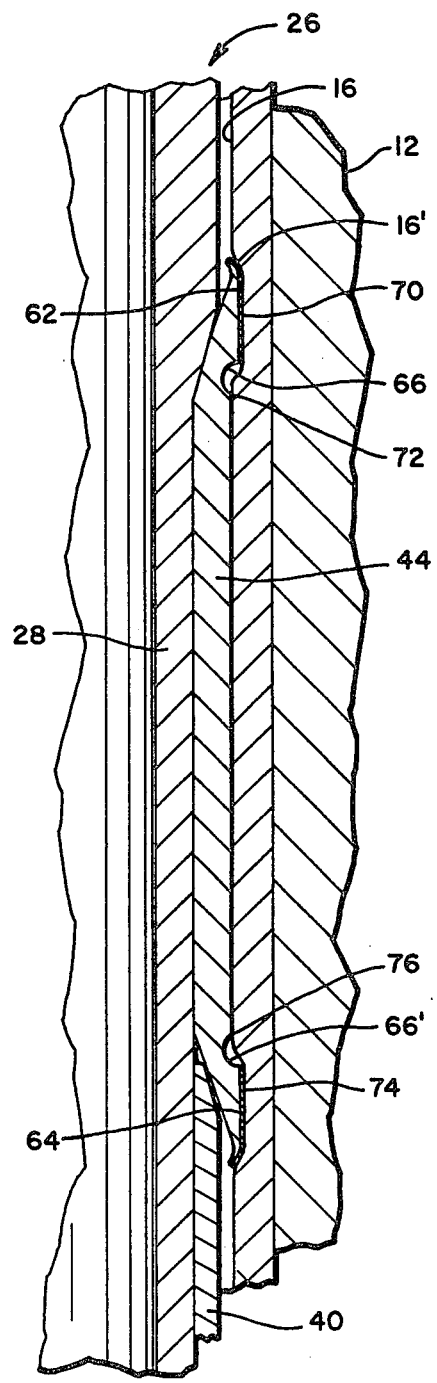
FIG. 5 is a view similar to FIG. 4 showing the sleeve member compressed by the tension member and ring member, to form upper and lower seals against the tube wall.

With reference also to FIGS. 4 and 5, the device or assembly 26 is shown to be secured to the tube wall 16 by drawing down the tension member 28 to longitudinally compress the sleeve member 44 against the ring 40. The compression forces cause the sleeve to expand against the tube wall 16. In the illustrated embodiment, the stem portion 34 of the tension member includes means, such as nut 54, for limiting the downward travel of the ring member 40 while permitting the tension member head portion 30 to be drawn downward relative to the ring. Preferably, the flange 42 of ring member 40 is initially spaced slightly below the tube sheet lower surface, so that as the nut 54 is turned, and the head 30 is drawn, the ring member advances a predetermined distance toward the sleeve 44, which distance is limited by the flange contact with the tube sheet.

Thus the tension member 28, compression member 44, and ring member 40 are operatively arranged such that when the tension member is drawn downward the oppositely facing tapered surfaces 46,50, and 48,52 advance wedge-like over each other, radially expanding the upper and lower circumferential outer end surfaces 62 and 64, respectively, of the compression sleeve member 44. The means for limiting the downward travel of the ring 40 and the means adapted to draw the tension member 28 downward, are preferably provided by the same tensioning nut 54, which is torqued along the screw thread 36 while a retention tool (not shown) is secured on the retention head 38 to prevent rotation of the tension member 28 while the device 26 is being installed.

The cooperation between the expander head 30, expander ring 40, and sleeve member 44 are shown in detail in FIGS. 4 and 5. The lower expander wedge 60 on the expansion ring 40 has an upwardly tapered surface 52 that overlaps with the downward facing tapered surface 48 on the inside of the lower end of the compression member 44. Likewise, the taper 50 on the expander head 30 is downward facing while the sleeve upper end taper 46 is upward facing. In the preferred embodiment, the outside circumferential surface 62,64 at the upper and lower ends of the sleeve, which are urged against the tube wall 16, are coated with a soft, non-corrosive metal, such as 24 karat gold. Also, the outer circumferential sealing surfaces 62,64, are preferably in the form of integral rims defined by circumferential grooves 66,66' near the upper and lower ends of the sleeve. In FIG. 4, the grooves 66,66' are shown just below, and above, the elevations 68,68', respectively, where the tapered surfaces 46,48 begin on the sleeve 44.

FIG. 5 shows the resulting upper primary seal surface 70 and upper secondary seal surface 72, and corresponding lower primary 74 and lower secondary 76 seal surfaces. The primary seals 70,74 are effected by plastic deformation of the rims 62 and 64 against the adjacent tube wall 16, which is also deformed at, for example, 16'. Grooves 66,66' provide flexibility at the ends of the compression sleeve member whereby the outward expansion forces available from the torquing of the nut 54 (see FIG. 2) bend the upper and lower portions of the sleeve sufficiently to form leak-tight, permanent primary seals. The secondary seals, which are less effective, provide a limited back in embodiments having the groove.

The compression sleeve member 44 may optionally have a different shape from that illustrated so long as the extremities that interact with the tension and ring members include a tapered inner surface and an outer circumference adapted to form salign surfaces when expanded against the tube wall. As used herein, "tapered" is not limited to inclined plane, but includes other shapes that can slide relative to each other.

Once the plug 26 has been installed, the steam generator may be operated without fear that radioactive liquid will penetrate the plug and enter the secondary coolant through defect 22 (see FIG. 1). There are circumstances, however, under which it may be desirable or necessary for the plug to be subsequently removed. This may arise when so many plugs have been inserted over a period of years, that the steam generator heat transfer capability has been diminished and thus the power output of the unit must be reduced. It may thus be cost-effective to remove plugs and reuse the tubes after installing bypass conduits.

The plug assembly shown in FIG. 2 can readily be removed by loosening the nut 54 and pulling down, if necessary, on the expander ring flange 42. The rims 62,64 will return to the positions shown in FIG. 4, enabling the oeprator to withdraw the entire plug assembly 26 from the tube 14.

In another embodiment of the invention, shown in FIG. 6 and 7, a bypass conduit assembly 80 is shown with the lower seal 82 formed within the tube sheet 12 and the upper seal 84 formed above the tube sheet, beyond the location of the tube defect 22 (FIG. 1). By way of example, the tube sheet may be up to about 20 inches in thickness, and the bypass conduit assembly 80 may be up to about 40 inches in length. The steam generator tube is typically ¾ to 7/8 inch O.D.

The bypass assembly 80 includes the same components previously described with respect to the tube plug assembly 26, except that the inner tension member 86 is hollow throughout its length. The function of retaining the tension member 86 while the nut 54a is torqued, is provided by a slot 88 on the stem 90 as shown in FIG. 7. A screw driver or eqivalent means (not shown) is inserted into the slot while the nut is turned.

The embodiment illustrated in FIGS. 6 and 7 also enables maintenance personell to withdraw the conduit bypass assembly 80 from the tube 14, by loosening the tensioning nut 54a and expander ring 40a so that the rims 62a,64a return to their original, unexpanded condition.

It may be appreciated that there are other variations possible by which the compression of the sleeve member can be effected, such as the use of an hydraulic drawup cylinder or other automated means to draw down the tension member, thereby expanding the sleeve at the upper and lower ends thereof. Such embodiments are within the scope of the invention and the appended claims.

I claim:

1. A device to be secured with a selected tube in a heat exchanger, the heat exchanger having a tube sheet and a plurality of tubes having open ends accessible from the lower surface of the tube sheet, said device comprising:
   a generally cylindrical tension member having a central body portion, a stem portion at its lower end and an enlarged head portion at its upper end;
   a generally cylindrical ring member concentrically disposed about the lower end of said body portion, said ring member including means for cooperating with the tube sheet lower surface to limit the upward travel of the ring member relative to the tube sheet;
   a generally cylindrical compression sleeve member surrounding said body portion between said head portion and said rig member, the upper and lower outer circumferential surfaces of the sleeve member being in the form of a flexible, integral rim defined by an external circumferential groove;
   said stem portion mounting means for limiting the downward travel of said ring member and means adapted to draw said tension member downward relative to said ring;
   said head and the upper portion of the sleeve member having oppositely facing, overlapping tapered surfaces;
   said ring and the lower portion of the sleeve member having oppositely facing, overlapping tapered surfaces;
   said tension member, compression sleeve member, and ring member operatively arranged such that when the tension member is drawn downward, the oppositely facing tapered surfaces advance wedge-like over each other, readially expanding the upper and lower circumferential outer surfaces at the ends said sleeve into deformed circumferential contact with the adjacent tube wall, forming respective upper and lower sals there against.

2. The device of claim 1 wherein the outer circumferential surfaces of the rims are plated with a soft non-corrosive metal.

3. The device of claim 2 wherein the plate material is gold.

4. The device of claim 1 wherein the upper end lower seals are formed by plastic deformation of the outer circumferential surfaces against the tube wall.

5. The device of claim 1 wherein said stem is threaded and the means for limiting the downward travel of the ring member and the means adapted to draw the tension member downward include a nut rotable about the stem while abutting the ring member.

6. The device of claim 1 wherein the head, sleeve member and ring member form a generally cylindrical assembly insertable within the tube, having substantially the same outer diameter as the tube inner diameter.

7. The device of claim 1 wherein the tension member is hollow throughout its length to permit fluid flow therethrough.

8. The device of claim 1 wherein the stem portion of the tension member is solid and the body and head portions are hollow.

9. A tube repair assembly comprising:
   a generally cylindrical tension member having a central body portion, a stem portion at its lower end, and a tapered head at its upper end;
   a generally cylindrical rig member concentrically disposed about the lower end of said body portion;
   a generally cylindrical compression sleeve member surrounding said body portion between said head portion and said ring member, the upper and lower outer circumferential surfaces of the sleeve member being in the form of a flexible, integral rim defined by an external circumferential groove;
   wherein the head, sleeve member and ring member form a generally cylindrical assembly insertable within a tube, having substantially the same outer diameter as the tube inner diameter;
   said head and the upper portion of the sleeve member having oppositely facing tapered surfaces;
   said ring member and the lower portion of the sleeve member having oppositely facing tapered surfaces; and
   means on said stem portion for advancing the ring member upward and said head downward such that the oppositely facing tapered surfaces advance wedge-like over each other, radially expanding the upper and lower circumferential outer surfaces at the ends of said sleeve, into sealing engagement against the tube.

10. The tube repair assembly of claim 9 wherein the tension member is hollow throughout its length to permit fluid flow therethrough.

11. The tube repair assembly of claim 9 wherein the stem portion of the tension member is solid and the body and head portions are hollow.

* * * * *